April 17, 1951     J. ISREELI ET AL     2,549,472
FLOW DIVIDER APPARATUS FOR HYDRAULIC SYSTEMS,
AND THE LIKE
Filed May 18, 1948
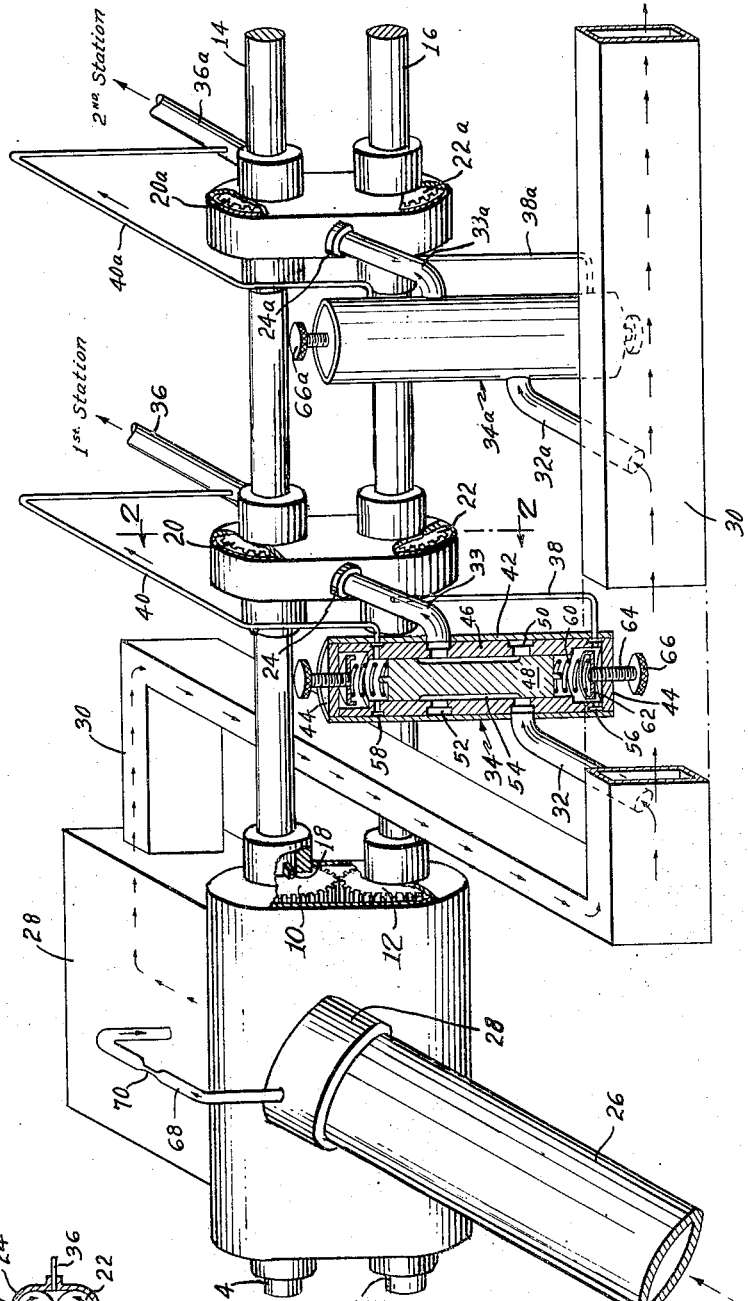
INVENTORS
Jack Isreeli
George T. Allen
BY
Pennie, Edmonds, Morton and Barrows
ATTORNEYS Patented Apr. 17, 1951

2,549,472

UNITED STATES PATENT OFFICE 2,549,472

FLOW DIVIDER APPARATUS FOR HYDRAULIC SYSTEMS AND THE LIKE

Jack Isreeli and George T. Allen, New York, N. Y., assignors to Simmonds Aerocessories, Inc., Tarrytown, N. Y., a corporation of New York Application May 18, 1948, Serial No. 27,706

17 Claims. (Cl. 137—166)

This invention relates to improvements in flow dividers or apparatus for dividing a stream of liquid into definite proportions, as for example, the division of a metered stream of liquid into a predetermined number of equal streams having equal volumes or rates of flow.

The invention has application to a number of uses where it is desirable or necessary to deliver equal volumes of a liquid to two or more different operating units where the same or different pressures may be involved. For example, in the operation of such devices as the landing flaps of an aircraft, it is sometimes necessary or desirable to synchronize the motions of two or more units driven by separate actuating cylinders. In order to do this, it is necessary to provide all cylinders of the units with the same volume of liquid in the same period of time while allowing the pressures to the different cylinders to vary as required by the load against which the different cylinders must operate. For example, two opposite landing flaps of an aircraft may present substantially different resistances to movement. Another example is the supply of a metered quantity of fuel to the engines of an aircraft and the equal division of such fuel. Where such engines are located at different distances from the source of fuel, different pressures may be required for delivering equal volumes of fuel to two or more engines.

The primary object therefore of the present invention is to provide an improved flow divider which will deliver equal volumes of liquid, or volumes of known relationship, to two or more operating units, regardless of any pressure differences necessary for making the delivery.

According to the present invention, the improved flow divider comprises a pair of intermeshing motor gears arranged like a gear pump, two or more pairs of metering gears for metering predetermined proportions of the liquid, driving connections between the motor gears and the metering gears for driving them at a speed related to the speed of the motor gears, means for delivering the liquid to be metered and divided to the pair of motor gears to drive them and thereby drive the pairs of metering gears, conduit means for distributing the liquid passed through the pair of motor gears to the pairs of metering gears, and means for conducting the metered liquid passed through each of the pairs of metering gears to a receiver or operating unit associated therewith. The flow divider advantageously includes a control valve means for each pair of metering gears for balancing or relating the inlet and outlet pressures for the pair of metering gears.

The control valves in the conduits leading to the pairs of metering gears, act to balance the pressure across the gears and thereby reduce leakage around and between the gears of each unit to negligible values. The control valves are advantageously provided with means for creating a pressure unbalance of known amount across the metering gears, particularly for regulating or adjusting any difference in capacity between the different pairs of metering gears of the flow divider. In a preferred form of control valve each mechanism comprises a cylinder with an inlet and outlet passageway and a floating piston or plunger adapted to be shifted endwise in the cylinder to restrict the flow between the inlet and outlet passageways, one end of the cylinder opposite the plunger being connected with the line from the pair of metering gears while the opposite end of the cylinder and plunger is connected with the inlet line to the pair of metering gears, so that the plunger will be subjected to the action of the pressures in these lines. This preferred valve construction advantageously includes means arranged to create a pressure unbalance of a known amount such as an adjustable urging spring at either or both ends of the plunger.

In the operation of the improved apparatus the delivery of liquid under pressure at the inlet side of the power or motor gears, whatever the quantity or rate, effects rotation of these gears and simultaneously rotates the gears of each pair of metering gears. Each pair of metering gears is therefore driven at a speed related to the speed of the power gears. The metering gears and the power gears advantageously have the same diameter, and the total number of pairs of metering gears have a total capacity equal to or slightly greater than the capacity of the power gears. The liquid forced through the motor gears is distributed to the pairs of metering gears and metered therethrough in volumes proportional to the relative capacities of the pairs of metering gears. Since the outlet lines from the different pairs of metering gears may be subjected to different pressures, the balancing valves for the metering gears operate to adjust the pressures across the respective pairs of metering gears.

Therefore, if the divided streams of liquid from the different pairs of metering gears are delivered to different operating cylinders, it will be apparent that each cylinder will receive a proportioned volume of liquid in a given time interval. Where one of the operating cylinders encounters a lower load than another operating cylinder, the pressure in the outlet line from the associated pair of metering gears will fall off to that of the value required to attain movement, but the volume will still be established by its metering gears operating in conjunction with the balancing control valve which, if the control valve is in the inlet line, will close down until the pressure drop across it is enough to reduce the gear inlet pressure to equal the outlet pressure necessary to actuate the operating cylinder. Any operating cylinder which may meet a high resistance will be able to receive full line pressure regardless of the fact that some other cylinder receives only that pressure which will cause it to operate at the same speed as the cylinder meeting the high resistance.

Other objects and features of the invention will be described in detail hereinafter in connection with one illustrative embodiment, although it will be understood that other embodiments different in detail from that shown and described may be made.

In the drawings forming a part of this application:

Fig. 1 is a diagrammatic perspective view partly in section, with other parts removed or broken away, of a system of apparatus elements arranged and constructed in accordance with the features of the invention.

Fig. 2 is a cross-sectional view on a smaller scale through one of the sets of metering gears taken on the line 2—2 of Fig. 1.

Referring to Fig. 1 of the drawings, the flow divider apparatus shown therein comprises a pair of intermeshing power or motor gears arranged with its individual gears 10 and 12 respectively mounted on shafts 14 and 16, the shaft 14 being rotatable and the shaft 16 being fixed. The gear 10 is splined or keyed to the shaft 14 by any suitable means such as a key 18 set in matching slots in the gear and shaft. The gears 10 and 12 are of the same size, and since they intermesh with each other, their rotation causes the gear 12 to rotate on the shaft 16 and the shaft 14 to be rotated.

The shafts 14 and 16 to the right of the pair of power gears carry the number of sets of metering gears for which the particular apparatus is built. In the embodiment illustrated, the width of the metering gears as shown is so related to the width of the power gears that the stream of liquid passed through the power gears and metered thereby would be delivered to nine pairs of metering gears and divided into nine equal portions, Fig. 1, however, showing the apparatus broken away so that only two of the pairs of metering gears are shown. Since all sets of metering gears and their associated connections are alike, a complete showing is unnecessary. In the Fig. 1 the first pair of metering gears to the right comprises a gear 20 keyed to the shaft 14 and intermeshing with a similar gear 22 rotatable on the shaft 16. The second pair of metering gears comprises gears 20a and 22a, the gear 20a being keyed to the shaft 14. The gears 22 and 22a rotate freely on the fixed shaft 16 and are driven respectively by the gears 20 and 20a. It will be understood that the pairs of motor gears 10 and 12 and the pairs of metering gears are each mounted in housings, as for example, like the housing 24 for the gears 20 and 22 shown in Fig. 2. The gears may be mounted in these housings in a manner similar to that used in making gear pumps or in any other effective way.

The liquid to be metered and divided by the apparatus is delivered at a selected pressure through a supply pipe 26 into a housing 28 for the pair of power gears 10 and 12. The pressure applied by the liquid in the pipe 26 and housing 28 drives the pair of gears 10 and 12 which in turn drive the shaft 14 and the nine pairs of metering gears associated therewith. The metering gears in the particular illustration have the same diameter and their teeth are cut the same as the power gears so that when liquid is supplied to the nine pairs of metering gears, the same quantity of liquid will be delivered by each in the same period of time. The liquid metered by the driving gears 10 and 12 through the housing 28 flows into a distributing gallery or duct 30 which extends along in front of the pairs of metering gears, so that liquid will be delivered to the same side as that on which it is delivered to the driving or power gears.

Liquid for the pair of gears 20 and 22 flows from duct 30 through a pipe or duct 32, a balancing control valve 34 and a duct 33, into the housing 24. The duct 33 delivers the liquid into the gear housing 24 and the liquid metered by the pair of gears 20 and 22 is conducted from the housing through a delivery duct 36 by which it is conducted to the first station such as a power cylinder, an internal combustion engine, receiver or other device. One end of the balancing valve 34 is connected into the duct 33 immediately in advance of the gears 20 and 22 by a duct or pipe 38. The opposite end of the balancing valve 34 is connected by a duct or pipe 40 with the delivery duct or pipe 36.

The next set of metering gears 20a and 22a have connections which are the same as those of the pair of metering gears just described, and therefore they are given the same numbers, except that the letter "a" is added.

Each of the control valves 34, 34a, etc. may have any suitable mechanism arranged to balance the inlet pressure with the outlet pressure of the respective pairs of metering gears, or relate these pressures as desired.

The particular structure shown in Fig. 1 for the balancing valve 34 includes an external cylindrical casing 42 having heads 44 which fit against and enclose a cylinder 46 within which a piston valve member 48 operates. The cylinder 46 is provided with external annular grooves 50 and 52 with which the ducts 32 and 33 respectively communicate. The grooves 50 and 52 also communicate with the internal bore of the cylinder through ports, as shown, while the piston-like valve member 48 is reduced in diameter through a substantial length of its mid-section, so as to provide an annular passageway 54 for the flow of liquid when the valve member 48 is moved to a position such as that shown, so that the ports leading from the channel or groove 50 are partly uncovered. The outlet ports from the passageway 54 to the duct 33 are always uncovered regardless of the position of the valve member 48. Liquid for moving the valve member 48 toward closed position is supplied to the space below this member through the duct 38 by way of an annular channel 56 in the outer portion of the cylinder 46, this channel being ported to the inside of the cylinder as shown. Liquid for moving the piston member 48 to open position is delivered to the upper part of the valve 34, to the space above the member 48 from the duct 40 which communicates with an annular channel or groove 58 in the outer surface of the cylinder 46, the groove being ported to the interior of the cylinder, as shown.

The control valves 34, 34a, etc. preferably include means such as an adjustable urging spring for creating pressure unbalance across the metering gears with which they are associated. For example, in the showing of the valve 34 each end is provided with a spring 60 having one end engaging the piston 48 and the other end set in a cup 62 carried by an adjusting screw 64 threaded in the head 44 and provided with a thumb screw 66. The springs 60 may be compression or tension springs, and the thumb screws 66 may be set so that the springs 60 are inactive, or either or both of the thumb screws 66 may be set so that the respective spring or springs can be made to urge the piston 48 to give a loading of known amount to in turn create a known unbalance or pressure difference between the inlet and outlet pressures for the pair of gears with which the valve is associated. The urging spring and adjusting means may be applied to only one end of the control valve instead of both ends, if desired.

In the operation of the apparatus as illustrated and described above, let it be assumed, for purposes of illustration, that the flow divider is connected up in a hydraulic system for operation, for example at 3000 lbs. per square inch, with the mechanism filled with liquid, and that there are only two distributing lines 36 and 36a which lead respectively to similar actuating cylinders of a pair of landing flaps of an aircraft. The pilot of the aircraft therefore applies pressure in the line 26 leading to the flow divider. The application of this liquid pressure is designed to meter a given volume of liquid through the motor or power gears 10 and 12, and cause these gears to rotate, which rotation in turn causes the simultaneous rotation of the pairs of metering gears including the gears 20 and 20a, keyed to the shaft 14. All gears rotate at the same speed and therefore the liquid delivered and metered through the power gears is divided equally by the pairs of metering gears so that equal volumes of liquid are delivered through the pipes 36 and 36a in the same time, whereby the landing flaps operated thereby will be moved in synchronism and to the same extent.

In this operation the control valves 34 and 34a, with the controls 66 properly adjusted, act to adjust the gear inlet pressure to equal the outlet pressure. For example, assume that the cylinder connected to the line 36 meets a lower load than the cylinder connected to the line 36a; pressure in the line 36 will fall off to the value required to maintain movement at the rate the liquid is supplied, since the volumes sent through the lines 36 and 36a are established by their respective metering gears. Under these conditions, with a lower pressure in the duct 40 than in the duct 38, the valve member 48 will close down the ports from the annular channel 50 until the pressure drop through the valve is enough to reduce the gear inlet pressure in the line 33 until it equals the outlet pressure in the line 36. At the same time the cylinder being supplied with liquid from the line 36a, and which meets the greater resistance, under the assumed conditions, will receive a higher pressure necessary to effect the desired movement and accommodate the same volume of liquid as the other cylinder.

In making a flow divider unit in accordance with the features of the invention, the pair of motor gears are preferably made with a slightly smaller capacity than that of the aggregate of the driven metering gears so that there will be some pressure drop across the motor gears and no build up of liquid ahead of the metering gears. The necessary extra liquid for the pair of metering gears is made up by providing a bypass duct or line 68 and orifice 70 which is advantageously connected between inlet and outlet sides of the gear housing 28. The pressure differential across the motor gears 10 and 12 to effect driving also acts across the orifice 70, and the liquid passing through orifice 70 comprises the additional liquid not supplied by the motor gears 10 and 12. Duct 68 and orifice 70 may be as large as necessary to supply the additional liquid, while at the same time providing the necessary pressure differential for driving the motor gears at the required speed. The orifice 70 is sized to provide some differential but not a high one and also to provide a volume balancing means between the motor and metering gears.

An adjustable urging spring for each control valve is advantageously included since the springs may be used to equalize flow from the metering gear units. Initially there may be unequal flow because of temperature influences or because the sets of metering gears or housings were not machined or cast exactly alike. The piston 48 for one unit, for example, is therefore unbalanced to the necessary extent to produce enough leakage around or pressure difference across the pair of metering gears to make the flow equal to that for another unit. Unequal flow having a known relationship may be obtained in the same manner if desired. The elements of the divider may be included in a compact block of assembled sections.

It will be understood from the foregoing description that various changes may be made in the apparatus, and that a given stream of liquid delivered through the inlet line 26 may be premetered and divided into any convenient number of equal parts for delivery to an equal or lesser number of operating stations, for the simultaneous actuation of various types of devices, the supply of motor fuel or liquid to engines or motors of any kind, or for other purposes. In some cases the driven metering gear units need not be of identical widths, as in the illustrative example, but may bear any desired relationship to each other, for example in width or capacity, so that they deliver streams having the desired relative rates of flow. It will be also understood that the metering gears need not be driven at the same rate as the motor gears, and that such changes may be made in the relative sizes or speeds, or both, of the different pairs of metering gears of a unit to proportion the liquid stream as desired. While all sets of gears are preferably mounted on a pair of shafts as described, the pairs of metering gears may be driven from the pair of motor gears by other types of driving means.

What we claim as new is:

1. A flow divider for dividing a stream of liquid into a predetermined number of equal streams, comprising a pair of intermeshing motor gears located in a housing, a pair of shafts extending into said housing on which said gears are respectively mounted, one of said gears being fixed to the shaft on which it is mounted to provide a driving shaft, a plurality of pairs of similar intermeshing metering gears mounted in parallel on said shafts with a gear of each pair fixed to the driving shaft, a housing enclosing each pair of the metering gears, means for delivering a stream of the liquid to be divided to the pair of motor gears to effect their rotation and the rotation of the driving shaft and the metering gears attached thereto, means for conducting the liquid passed through the motor gears and for distributing it in parallel through inlet lines to the pairs of metering gears, a conduit leading from each pair of the metering gears for delivering a divided portion of the liquid, and valve means for each pair of metering gears for controlling the pressure differential of the liquid between the inlet and outlet of the pair of metering gears.

2. A flow divider as defined by claim 1 in which the metering gears have the same diameter and tooth characteristics as the motor gears and in which the aggregate widths of the metering gears are at least as great as the width of the pair of motor gears.

3. A flow divider as defined by claim 1 in which the aggregate capacities of the metering gears is greater than that of the motor gears, and a bypass line around the motor gears for balancing the capacities.

4. A flow divider for dividing a stream of liquid into a plurality of streams having a predetermined volume relationship, comprising a pair of intermeshing motor gears mounted for rotation in a housing, a plurality of pairs of intermeshing metering gears, a housing enclosing each pair of the metering gears, a driving connection between the pair of motor gears and each pair of metering gears for driving the latter, means for delivering a stream of liquid to be divided to the pair of motor gears to effect their rotation and the rotation of the metering gears, conduit means for conducting the entire stream of liquid passed through the motor gears and for distributing it to the pairs of metering gears, a conduit leading from each pair of the metering gears for delivering a divided portion of the liquid stream, and a valve associated with each pair of metering gears for controlling the relationship of the liquid pressures between the inlet and outlet of the pair of metering gears.

5. A flow divider as defined by claim 4 in which the pairs of metering gears have the same diameter as the motor gears.

6. A flow divider as defined by claim 4 in which the plurality of pairs of metering gears have a predetermined capacity relationship to each other.

7. A flow divider as defined by claim 4 in which the combined capacities of the plurality of pairs of metering gears is at least as great as the capacity of the pair of motor gears.

8. A flow divider as defined by claim 4 in which the aggregate capacities of the pairs of metering gears is greater than that of the motor gears, a bypass line around the motor gears for supplying the extra liquid for the pairs of metering gears, and means in the line for restricting flow.

9. A flow divider as defined by claim 4 in which the valve associated with each pair of metering gears includes an adjustable means for biasing the valve.

10. A flow divider as defined by claim 4 in which the valve for each pair of metering gears comprises a cylinder, a piston in the cylinder having an annular channel intermediate its ends for the flow of liquid to the metering gears, a duct connecting one end of the cylinder with the inlet conduit between the valve and the pair of gears, and a duct connecting the opposite end of the cylinder with the conduit leading from the pair of metering gears.

11. A flow divider as defined by claim 10 characterized by including an adjustable biasing means associated with the valve for biasing the piston in the cylinder.

12. A flow divider for dividing a stream of liquid into a plurality of streams having a predetermined volume relationship, comprising a pair of intermeshing motor gears mounted for rotation in a housing, a plurality of pairs of intermeshing metering gears, a housing for separately enclosing each pair of the metering gears, a driving connection between the pair of motor gears and each pair of metering gears for driving the latter, means for delivering a stream of liquid to be divided to the pair of motor gears to effect their rotation and the rotation of the metering gears, means for conducting the liquid passed through the motor gears and for distributing it to the pairs of metering gears, and a conduit leading from each pair of the metering gears for delivering a divided portion of the liquid.

13. A flow divider as defined by claim 12 characterized by including a control valve for the liquid conducted through each pair of metering gears arranged to control the pressure at the inlet of the pair of gears with respect to that in the outlet conduit leading therefrom.

14. A flow divider as defined by claim 12 in which the pairs of metering gears have the same diameter and gear characteristics as the motor gears.

15. A flow divider as defined by claim 12 in which the plurality of pairs of metering gears have a predetermined capacity relationship to each other.

16. A flow divider as defined by claim 12 in which the combined capacities of the plurality of pairs of metering gears are at least as great as the capacity of the pair of motor gears.

17. A flow divider as defined by claim 12 characterized by including a conduit with a restriction connecting the inlet and outlet of the pair of motor gears.

JACK ISREELI.
GEORGE T. ALLEN.

REFERENCES CITED

The following references are of record in the file of this patent:

UNITED STATES PATENTS

| Number | Name | Date |
|---|---|---|
| 1,272,212 | Callan | July 9, 1918 |
| 1,682,776 | Crabb | Sept. 4, 1928 |
| 2,344,465 | Lauck | Mar. 14, 1944 |